(12) United States Patent
Pearson et al.

(10) Patent No.: US 11,407,208 B1
(45) Date of Patent: Aug. 9, 2022

(54) STRUCTURAL COMPOSITE PANELS FOR MOTOR HOMES, RECREATIONAL VEHICLES, AND TRAILERS

(71) Applicant: Talaco Holdings, LLC, Lawrenceville, GA (US)

(72) Inventors: Bennett McDonald Pearson, Lancaster, TX (US); Robert Keith Salsman, Hoschton, GA (US)

(73) Assignee: TALACO HOLDINGS, LLC, Lawrenceville, GA (US)

( * ) Notice: Subject to any disclaimer, the term of this patent is extended or adjusted under 35 U.S.C. 154(b) by 0 days.

(21) Appl. No.: 17/188,305

(22) Filed: Mar. 1, 2021

Related U.S. Application Data

(63) Continuation of application No. 16/551,322, filed on Aug. 26, 2019, now abandoned.
(Continued)

(51) Int. Cl.
*B32B 27/08* (2006.01)
*B32B 27/36* (2006.01)
*B32B 27/40* (2006.01)
*B32B 5/18* (2006.01)
*B32B 27/06* (2006.01)
(Continued)

(52) U.S. Cl.
CPC .............. *B32B 27/08* (2013.01); *B32B 5/022* (2013.01); *B32B 5/18* (2013.01); *B32B 7/12* (2013.01); *B32B 21/08* (2013.01); *B32B 27/065* (2013.01); *B32B 27/12* (2013.01); *B32B 27/36* (2013.01); *B32B 27/40* (2013.01); *B32B 2305/022* (2013.01); *B32B 2305/08* (2013.01); *B32B 2605/00* (2013.01); *B60P 3/32* (2013.01);
(Continued)

(58) Field of Classification Search
CPC ........... B32B 27/08; B32B 5/022; B32B 5/18; B32B 7/12; B32B 21/08; B32B 27/065; B32B 27/12; B32B 27/36; B32B 27/40; B32B 2305/022; B32B 2305/08; B32B 2605/00
See application file for complete search history.

(56) References Cited

U.S. PATENT DOCUMENTS 5,877,255 A * 3/1999 Gerber ............... C08G 18/4615
524/590
6,232,433 B1 5/2001 Narayan
(Continued)

*Primary Examiner* — Frank J Vineis
*Assistant Examiner* — Laura B Figg
(74) *Attorney, Agent, or Firm* — Thomas | Horstemeyer, LLP

(57) ABSTRACT

The present disclosure relates to laminate composite panels comprising a first layer of fiberglass reinforced polyester ("FRP") and a second layer of a polyurethane material. The polyurethane layer can comprise a reaction product between an aromatic polyester polyether polyol and a diisocyanate. The polyurethane is cured-in-place on a surface of the FRP, thus creating a laminate composite material wherein the layers are adhered together without application of a separate adhesive layer. The panels exhibit improved water resistance and strength properties. The laminate composite can be adhered to a second material such as wood, polystyrene, polyurethane, or non-wovens. Such panels are particularly suitable for use in recreational vehicles, motor homes, trailers, and as building materials. Methods of making such laminate composite materials are also provided.

19 Claims, 1 Drawing Sheet

Related U.S. Application Data

(60) Provisional application No. 62/722,874, filed on Aug. 25, 2018.

(51) Int. Cl.
*B32B 21/08* (2006.01)
*B32B 5/02* (2006.01)
*B32B 27/12* (2006.01)
*B32B 7/12* (2006.01)
*B62D 63/06* (2006.01)
*B62D 29/04* (2006.01)
*B62D 29/02* (2006.01)
*B60P 3/32* (2006.01)

(52) U.S. Cl.
CPC ............ *B62D 29/02* (2013.01); *B62D 29/043* (2013.01); *B62D 63/06* (2013.01)

(56) References Cited

U.S. PATENT DOCUMENTS

| | | |
|---|---|---|
| 8,757,704 B2 | 6/2014 | Zhao |
| 9,409,607 B2 | 8/2016 | Osten |
| 2005/0176321 A1* | 8/2005 | Crette ..................... B32B 5/18 |
| | | 442/154 |
| 2008/0001429 A1 | 1/2008 | Willis |
| 2008/0225638 A1 | 9/2008 | Bien |
| 2014/0352248 A1 | 12/2014 | Whispell |
| 2019/0119439 A1 | 4/2019 | Queen |

* cited by examiner

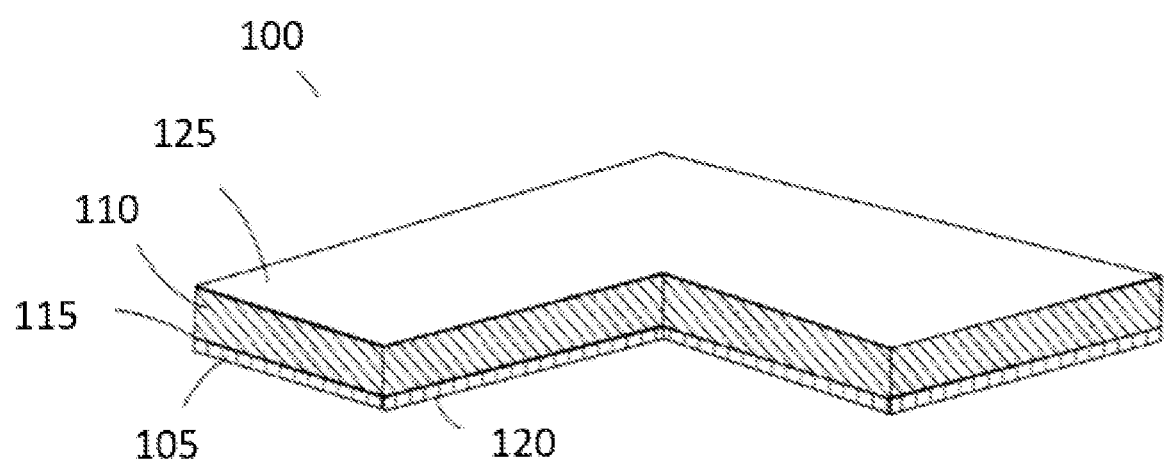

STRUCTURAL COMPOSITE PANELS FOR MOTOR HOMES, RECREATIONAL VEHICLES, AND TRAILERS

CROSS-REFERENCE TO RELATED APPLICATIONS

This application is a continuation of U.S. Non-Provisional patent application Ser. No. 16/551,322, filed Aug. 26, 2019, which claims priority to U.S. Provisional Patent Application No. 62/722,874, filed Aug. 25, 2018, both of which are hereby incorporated by reference in their entireties.

FIELD OF THE DISCLOSURE

The present disclosure relates to laminate composite panels comprising a first layer of fiberglass reinforced polyester ("FRP") and a second layer of a polyurethane material. The polyurethane layer can comprise a reaction product between an aromatic polyester polyether polyol and a diisocyanate. The polyurethane is cured-in-place on a surface of the FRP, thus creating a laminate composite material wherein the layers are adhered together without application of a separate adhesive layer. The panels exhibit improved water resistance and strength properties. The laminate composite can be adhered to a second material such as wood, polystyrene, polyurethane, or non-wovens. Such panels are particularly suitable for use in recreational vehicles, motor homes, trailers, and as building materials. Methods of making such laminate composite materials are also provided.

BACKGROUND OF THE DISCLOSURE

Structural components for a large percentage of motor homes, recreational vehicles, and trailers, are commonly constructed using laminate panels made from either corrugated sheet metal (e.g., aluminum) or rolls of fiberglass reinforced polyester ("FRP") sheets as the side that is exposed to the outside. In recent years, because of its decorative nature and lesser propensity to become dented or damaged, FRP has become a preferred material for motor homes, RVs, and trailers for recreational use. In some instances, tractor trailers also use this configuration. While FRP material can be used by itself by affixing it to structural supports, to impart greater structural strength and durability, FRP is often laminated to lauan, a plywood material derived from wood indigenous to Indonesia.

In a conventional production of FRP composite panels laminated to lauan, a gel coat layer is first laid down on a mold, followed by a layer of resin and glass fibers, thus forming a wet laminate. A layer of lauan is then applied directly to the wet laminate. The resin contains one or more promoters, and depending on the resin used, peroxide may also be added to the resin just before it is introduced into the mold. The peroxide acts as a cure initiator by reacting with the promoter and causing the resin to polymerize and harden. It additionally results in the resin bonding to the lauan, forming a flat, hard composite sheet.

In another production method, a rolled FRP sheet material can be laminated to the lauan using adhesive. In this iteration, a FRP panel is constructed from rolls of thin FRP sheets. The sheet is cut to size and stiffened by laminating lauan to the sheets by applying a separate adhesive to tie the layers together. Adhesion promoters can be added to improve lamination quality. Adhesives used can be moisture curable urethanes or hot melt adhesives. The adhesive is commonly spread on the FRP and the lauan is adhered thereto with the adhesive forming a layer in between. To effect curing of the adhesive, the panels are pressed or pinched together and allowed to cure as needed. As would be recognized, a separate adhesive will likely result in increased attachment between the FRP sheet and the lauan panel.

For either process, some manufacturers use a vacuum to remove moisture and air from the composite to improve contact between the laminate layers and to enhance drying. Once adhesive curing is completed, the composite laminate panels are mounted to metal framing to form the structural aspects of the motor home etc.

Notwithstanding the popularity of FRP-lauan composite panels today in the manufacture of motor homes, etc., several problems have emerged from use of these materials.

First, shortages and price increases of lauan have been observed due to reduction in overall supply from the sole source of Indonesian. Use of lauan is also decreasingly acceptable to the public because of the lack of sustainability and contribution to the deforestation.

Aside from sourcing issues, as a naturally derived material, lauan is not entirely uniform or consistent in its properties from panel to panel. The lauan commonly exhibits lot to lot variation in raw materials. Quality control methods must therefore be used to ensure that the material being used is appropriate for the intended application. Prior to use, the lauan must be equilibrated to the location and care must be taken to minimize the amount of humidity in the area, as moisture present in the wood can affect both the short and long term performance of the resulting composite. Significant manufacturing floor space must be allocated for this conditioning. In addition, lauan can emit certain amounts of formaldehyde, and has a strong propensity to absorb and retain water, and thus is susceptible to mildew and bacterial infiltration. In addition, the seams between adjoining panels of lauan may be visible in the finished product, which is unaesthetic, especially in high end vehicles.

Moreover, use of adhesives in the quantities necessary to attain the necessary adhesion between the FRP and lauan can result in the emission of substantial volatile organic compounds ("VOCs"). Such VOCs contribute to environmental ozone levels in areas where manufacturing plants are located, and it is desirable to reduce the amount of such emissions, if only to reduce the negative effects of manufacturing facilities on residents who live and work near the plant. Air quality inside the manufacturing plants must also be managed to be in compliance with government regulations related to employee exposure. Such management can be costly. For at least these reasons, it is desirable to reduce usage of adhesives that emit problematic fumes.

Delamination can be a common occurrence with FRP-lauan laminates, even in fairly new vehicles. Voids in the lauan may turn into cracks and spread (commonly referred to as "telegraphing"), which imparts high stresses to the composite. This leads to the potential of micro-cracking of the gel coat surface upon exposure to hot, cold and damp weather conditions To this end, water can find a point of entry at any small opening on the seaming that extends along the outside of the structure. Such openings are not unexpected because the mobile home is subjected to forces (e.g., wind, acceleration, bumping etc.) in road use, as is intended with these products. Even a small amount of water infiltration can cause extensive damage to the structure. That is, once a point of entry for water is generated, water can travel along that path within the FRP-lauan interface, as well as along seam that join different lengths of composite panels to create the structure. A small water leak can therefore result quickly in significant water damage to a vehicle. This means that FRP-lauan composite panels can be a primary failure point in an expensive motor home etc.

There remains a need for improvements in materials suitable for creating structural components for motor homes, recreational vehicles, trailers and the like. The present disclosure provides these and other benefits.

SUMMARY OF THE DISCLOSURE

In various aspects, the present disclosure relates to composite laminate materials comprising: (a) a first layer comprising a fiber reinforced polyester ("FRP") material having a front-facing side and a back side; and (b) a second layer comprising a polyurethane reaction product of an aromatic polyester polyether polyol and a diisocyanate, wherein the polyol and the diisocyanate are cured-in-place on the back side of the FRP material to form the second layer, thereby providing a FRP-polyurethane composite laminate material. The cured-in-place aspect of the composite laminate results in the FRP being adhered to the polyurethane without application of a separate adhesive layer.

Still further, in some instances, the polyester polyether polyol of the composite laminate material is derived from a transesterification reaction between PET and either ethoxylated trimethylol propane or ethoxylated glycerol. The ethoxylated trimethylol propane or ethoxylated glycerol can comprise from about 2 to about 9 moles of ethoxylation. The PET used in the transesterification reaction can comprise at least some PET derived from a recycled source.

In a further aspect, the present disclosure relates to laminate composite materials comprising: (a) a first layer comprising: (i) a composite layer comprising: (a) a fiber reinforced polyester ("FRP") material having a front-facing side and a back side; and (b) a polyurethane reaction product of an aromatic polyester polyether polyol and a diisocyanate, wherein the polyol and the diisocyanate are cured-in-place on the back side of the FRP material to provide a FRP-polyurethane laminate composite material; and (ii) a second layer, wherein the composite layer is adhered to the second layer via an adhesive.

Yet further, the adhesive of the laminate composite materials comprises a layer of the polyurethane reaction product of the aromatic polyester polyether polyol and a diisocyanate, wherein the polyol and the diisocyanate are cured-in-place between the composite layer and the second layer.

Still further, in some instances, the polyester polyether polyol of the laminate composite materials is derived from a transesterification reaction between PET and either ethoxylated trimethylol propane or ethoxylated glycerol. The ethoxylated trimethylol propane or ethoxylated glycerol can comprise from about 2 to about 9 moles of ethoxylation. The PET used in the transesterification reaction can comprise at least some PET derived from a recycled source.

In some instances, the second layer of the laminate composite materials comprises wood, non-woven material, expanded polystyrene, extruded polyurethane, or foamed polyurethane. The second layer of the laminate composite materials is wood, and the wood therein can comprise plywood or oriented strand board. The second layer of the laminate composite materials is foamed polyurethane in which the foamed polyurethane can be derived from the reaction product of the aromatic polyester polyether polyol and the diisocyanate, wherein a blowing agent is incorporated therein. The second layer of the laminate composite materials is expanded polystyrene or extruded polyurethane. Yet further, the second layer of the laminate composite materials is a non-woven.

Additional advantages of the disclosure will be set forth in part in the description that follows, and in part will be apparent from the description, or may be learned by practice of the disclosure. The advantages of the disclosure will be realized and attained by means of the elements and combination particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

FIG. 1 illustrates an example of an implementation of the present disclosure.

DETAILED DESCRIPTION OF THE DISCLOSURE

The present disclosure is directed toward FRP-polyurethane composite panels for use as structural components (e.g., walls, roofs) in motor homes, recreational vehicles, and trailers. Such laminate composite panels are suitable for replacing vehicle structural panels in use today that comprise FRP-lauan composites, as well as for other uses. The disclosed laminate composite panels exhibit improved properties in use as compared to prior art composite panels as described in more detail hereinafter.

In one aspect, the composite panels of the present disclosure comprise a fiberglass reinforced polyester ("FRP") layer adhered to a polyurethane layer, wherein the polyurethane is comprised of the reaction product of an aromatic polyester polyether polyol as described in as described in US Patent Publication No. 2019/0119439 (published on Apr. 25, 2019; application filed Oct. 18, 2018; hereinafter referred to as the "'439 Publication"), the disclosure of which is incorporated herein in its entirety by this reference, and a diisocyanate material. As described in the '439 Publication, such a thermoset polyurethane material exhibits heretofore unrealized beneficial adhesive properties when the polyol and diisocyanate are cured in contact with a surface of a second material, in this case, a pre-formed FRP material, as discussed hereinbelow. As such, the laminate composite panels of the present disclosure are substantially free of an adhesive layer between the FRP layer and the polyurethane layer. Yet further, the disclosed composite panels consist essentially of a first layer of FRP and a second layer of a polyurethane that is the reaction product of an aromatic polyester polyether polyol and a diisocyanate as described herein. Still further, the composite panels of the present disclosure comprise an adhesive layer that comprises the reaction product of a polyester polyether polyol and a diisocyanate.

The composite laminate material can range between a variety of thicknesses suitable for uses as disclosed herein. For example, the thickness can be from about 1 to about 5 mm in thickness, exclusive of any second layer (such as wood, a second layer of polyurethane etc.) as discussed elsewhere herein. Yet further, the thickness of the composite laminate material can be from about 2 to about 4 mm in thickness, exclusive of any second layer.

As would be recognized, polyurethanes result from the exothermic reaction between materials with two or more reactive hydroxyl (—OH) groups per molecule (diols, triols, polyols) and isocyanates that have more than one reactive isocyanate group (—NCO) per molecule (diisocyanates, polyisocyanates). For example, a diisocyanate reacts with a diol:

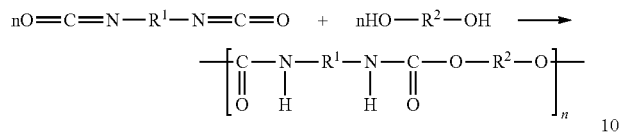

To generate a polyurethane, it is necessary to mix the right amounts of the two major components (polyisocyanate and polyol), which are liquids. The reaction commences almost immediately and generates the solid polymer upon completion of curing. As the reaction progresses, the polyol-isocyanate mixture begins to gel in a manner that, if comprised of reactants with the appropriate characteristics, can allow strong adhesive bonds to be formed in a cure in place operation. Completion of curing may require the material to be allowed to set for minutes, hours, or a few days, depending on the conditions under which the curing occurs.

The polyurethane composition that forms one part of the disclosed laminate composite panel comprises an aromatic polyester polyether polyol generated, in one aspect, from a transesterification reaction of polyethylene terephthalate ("PET") and a low molecular weight polyol, where the low molecular weight polyol comprises either or both of ethoxylated trimethylol propane or ethoxylated glycerin, and wherein each of the ethoxylated trimethylolpropane or ethoxylated glycerin has been modified with from about 2 to about 9 moles of ethylene oxide according to known methodology. That is, it is understood that "ethoxylated trimethylpropane" refers to a reaction product of trimethylol propane and about 2 to about 9 moles of ethylene oxide. Similarly, it is understood that "ethoxylated glycerin" refers to a reaction product of glycerin and about 2 to about 9 moles of ethylene oxide. Yet further, each of the ethoxylated trimethylolpropane or ethoxylated glycerin has been modified with about 2 or about 3 or about 4 or about 5 or about 6 or about 7 or about 8 or about 9 moles of ethylene oxide, wherein any value can form an upper or lower ethylene oxide modification endpoint, as appropriate. Still further, the disclosed aromatic polyester polyether polyol is derived from transesterification of PET with ethoxylated trimethylol propane or ethoxylated glycerin consisting essentially of 2 to 9 moles of ethoxylation, or, in more specific implementations, 2 or 3 or 4 or 5 or 6 or 7 or 8 or 9 moles of ethoxylation.

The inventors herein have surprisingly discovered that the use of ethoxylated trimethylolpropane or ethoxylated glycerin having the specified degree of ethoxylation provides a collection of properties in both the disclosed aromatic polyester polyether polyol, as well as the reacted polyurethane material that is used to generate the disclosed laminate material. With respect to the former, transesterification of the PET with the low molecular weight hydroxyl containing materials of ethoxylated trimethylolpropane and ethoxylated glycerin having the specified degree of ethoxylation has been found to provide a polyol having a beneficially low viscosity to allow both application efficacy onto a substrate surface, as well as providing efficient contact with the FRP surface and reaction characteristics between and among the hydroxyls in the polyol and the reactive moieties of the isocyanate materials.

By way of further explanation, the polyol useful in the present disclosure can comprise an aromatic polyester polyether polyol having a structure that is either:

a) based on a glycerol backbone, the structure represented by a formula:

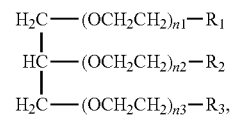

wherein each of $R_1$, $R_2$, and $R_3$ is independently selected from hydroxyl and a structure represented by a formula:

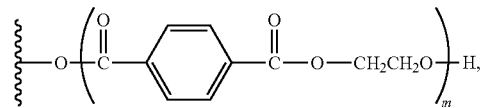

provided that at least one of $R_1$, $R_2$, and $R_3$ is not hydroxyl;

wherein m has a value such that the aromatic polyester polyether polyol has a Brookfield Cone and Plate Viscosity of less than about 5 Poise carried out using Spindle #4, 100 rpm, and 60° C.;

and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9;

or b) based on a trimethylolpropane backbone, the structure represented by a formula:

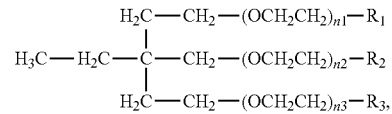

wherein each of $R_1$, $R_2$, and $R_3$ is independently selected from hydroxyl and a structure represented by a formula:

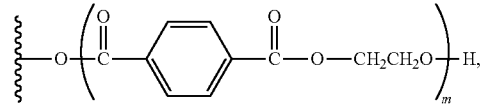

provided that at least one of $R_1$, $R_2$, and $R_3$ is not hydroxyl;

wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

In some implementations, the aromatic polyester polyether polyol can consist essentially of the glycerol backbone or the trimethylolpropane backbone. Still further, the aromatic polyester polyether polyol of claim 1 having a PET component derived from at least some recycled PET material, for example 50% recycled material. Yet further, the polyol can have a first Brookfield Cone and Plate Viscosity of about 2.7 to about 3.2 Poise carried out using Spindle #4, 100 rpm, and 60° C. or a second Brookfield Cone and Plate Viscosity of about 3.2 to about 3.8 Poise carried out using Spindle #4, 100 rpm, and 60° C. A ratio of PET to triol at the start of the transesterification reaction can be from about 10:90 to about 90:10. Other features of the aromatic polyester polyether polyol used herein is set out in the '439 Publication, the disclosure of which is incorporated herein in its entirety by this reference.

In a notable aspect, the present disclosure comprises as one component of the composite material a polyurethane material derived from an aromatic polyester polyether polyol that exhibits strong adhesion when in in situ polymerization process—that is, cured-in-place—to the back side of a FRP material, that is, the side of the FRP panel that comprises the non-decorable side. When fully cured-in-place on a surface of the FRP material, the adhesive strength of the polyurethane composition is such that the adhesive bond between the FRP material and the cured-in-place polyurethane coating is greater than the internal strength of the FRP material itself. In this regard, the internal bonding in the FRP material will break or fracture before the adhesive bond fails between the material and the coating.

A significant aspect of the present disclosure can comprise the use of PET, generally in the form of flakes or pellets, whether virgin or recycled, to generate the hydroxyl functionality for reaction with the isocyanate. Recycled PET can be post-consumer or pre-consumer generated. A common source is the pre- or post-consumer waste stream of PET from plastic bottles or other containers. Such PET can be colorless or contain dyes (e.g., green, blue, or other colors) or be mixtures of these. A minor proportion of organic or inorganic foreign matter (e.g., paper, other plastics, glass, metal) can be present, which can be separated out prior to the transesterification reaction. A desirable source of PET is "flake" PET, from which many of the common impurities present in scrap PET bottles have been removed in advance. Another desirable source of PET is pelletized PET.

The polyurethane component can comprise a substantial amount of recycled material. In this regard, the polyurethane can comprise up to about 50% recycled/sustainable content (when the ratio of polyol:isocyanate is 1:1 and 100% recycled PET and naturally derived glycerol are used to prepare the polyol component). Typically, the amount of recycled/sustainable content in the polyurethane component will be less than about 50%, at least because the ratio of polyol to isocyanate can be less than about 1:1. It can nonetheless be desirable to incorporate at least some recycled material in the polyol component so as to reduce the environmental impact of the motor homes, etc. In some aspects, the amount of recycled/sustainable content in the disclosed laminate materials—that is, the FRP-polyurethane composite—is at least about 5%, or at least about 10%, or at least about 15%, or at least about 20%, or at least about 25%, where the percentage is measured in relation to the total content of the disclosed laminate composite material.

The isocyanate with which the disclosed aromatic polyester polyether polyol is reacted to generate the disclosed polyurethane can comprise one or more of a variety of diisocyanates. An exemplary diisocyanate monomer can include toluene diisocyanate, m-phenylene diisocyanate, p-phenylene diisocyanate, xylene diisocyanate, 4,4'-diphenylmethane diisocyanate, hexamethylene diisocyanate, isophorone diisocyanate, polymethylene polyphenyl diisocyanate, 3,3'-dimethyl-4,4'-biphenylene diisocyanate, 3,3'-dimethyl-4,4'-diphenylmethane diisocyanate, 3,3'-dichloro-4,4'-biphenylene diisocyanate, or 1,5-naphthalene diisocyanate; their modified products, for instance, carbodiimide-modified products; or the like, or any combination thereof. Such diisocyanate monomers can be used alone or in admixture of at least two kinds. In a particular example, the isocyanate component can include methylene diphenyl diisocyanate (MDI), toluene diisocyanate (TDI), hexamethylene diisocyanate (HDI), isophorone diisocyanate (IPDI), or any combination thereof. In an example, the isocyanate can include methylene diphenyl diisocyanate (MDI) or toluene diisocyanate (TDI). In particular, the isocyanate includes methylene diphenyl diisocyanate (MDI) or derivatives thereof.

In one aspect, the isocyanate component can be methylene diphenyl diisocyanate (MDI). Yet further, the isocyanate component consists essentially of MDI. In a further example, a diisocyanate can include a mixture of diisocyanates, such as a mixture of modified methylene diphenyl diisocyanates. A suitable MDI for use in the disclosure herein is PAPI™ 27 (Dow Chemical, Midland, Mich.), a polymeric MDI (methylene biphenyl diisocyanate) with 31.4% NCO.

The diisocyanate can have an average functionality in a range of about 2.0 to 2.9, such as a functionality of from about 2.0 to about 2.7. Further, the diisocyanate can have an NCO content in the range of from about 15% to about 35%, such from about 20% to about 30%.

The catalyst used to accelerate the reaction between the aromatic polyester polyether polyol and the isocyanate can include an organometallic catalyst, an amine catalyst, or a combination thereof. An organometallic catalyst, for example, can include dibutyltin dilaurate, a lithium carboxylate, tetrabutyl titanate, a bismuth carboxylate, or any combination thereof.

The amount of disclosed aromatic polyester polyether polyol to isocyanate can vary according to the amount of hydroxyl functionality on the polyol available to react with the isocyanate moieties. In regards to the disclosed aromatic polyester polyether polyols, higher ethoxylation levels on the trimethylol propane and the glycerin will result in a less amount of hydroxyl functionality. For the 5 moles of ethoxylation example, the amount of aromatic polyester polyether polyol to isocyanate can be from about 1:1 or about 0.95:1 or about 1:0.95 on a volume:volume ratio of reactive moieties in each component. As would be recognized, additives in either the polyol or isocyanate will result in a variation of the volume ratios to generate the appropriate reaction ratios.

Still further, a blowing agent can be incorporated to provide a foamed reaction product. Such foaming can improve the insulative properties of the disclosed laminate composite material. Suitable blowing agents are disclosed in U.S. Provisional Patent Application No. 62/794,794 filed Jan. 21, 2019, the disclosure of which is incorporated herein in its entirety by this reference.

When used, fiber fillers suitable for use in the polyurethane layer can include glass fibers, carbon fibers, graphite fibers, synthetic organic fibers, particularly high modulus organic fibers such as para- and meta-aramid fibers, nylon fibers, polyester fibers, or any of the thermoplastic resins mentioned above that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural an/or synthetic fibers, ceramic fibers, or mixtures thereof. The fiber content in the polymer resin may is not particularly limited, but may be typically in the range from about 15% to about 85%, more particularly from about 45% to about 60%, by weight of the polymer resin. Filled polyurethane layers will be thicker than unfilled layers, as would be appreciated.

This polyurethane layer can be prepared using conventional mixing methods. In accordance with the properties of the components, however, the inventors herein have determined that, in some implementations, it can be useful to incorporate a dynamic mixing head in the manufacturing processes herein. Such dynamic mixing heads are known and are disclosed, for example, in US Patent Publication No. 20080225638, the disclosure of which is incorporated herein in its entirety by this reference.

Turning now to the FRP panel, a common manufacturing process for fiberglass is the wet lay-up or chopper gun spray process using a belt or an open mold. The belt process comprises a continuous process to create a coilable roll of FRP. For sheet goods, a mold of slightly larger width for the intended sheet can be used. Gel coat, which is pigmented resin, is applied to the belt or mold to give the part color and/or texture. The gel coat layer will be visible in the finished laminate product. The gel coated surface are paintable/decorable on the side that is visible in use, for example, the outer (e.g., externally visible) surface of an RV, motorhome, etc. Fiberglass and resin are then deposited over the gel coat surface on a back side thereof and the fiberglass can be compressed by rollers, which evenly distributes the resin and removes air pockets. Multiple layers of fiberglass can be deposited until the desired thickness is achieved for the FRP material. Once the resin is cured, the part is coiled (if from a belt process) or cut into sheets (if from a mold process). Excess material is trimmed off, and the part is ready for further use.

FRP materials suitable for use in the present disclosure can be obtained from Crane Composites (Channahon, Ill.). FRP products that can be used herein include Filon® G-III, which is a coilable semi-rigid reinforced polyester resin material. Coilable Filon G-III FRP product supplied in a nominal thickness of from 0.045 inches (1.1) to 0.07 inches (1.8 mm) and a nominal weight of 0.31 lb/ft$^2$ (1.5 kg/m$^2$) to 0.51 lb/ft$^2$ (2.5 kg/m$^2$). The manufacturer reports that Filon G-III is prepared from a modified polyester resin comprising inorganic fillers and pigments reinforced with random chopped fiberglass roving. Another suitable coilable FRP material is Crane Gold, also a product of Crane Composites. Such product is supplied in nominal thickness of 0.065 inches (1.7 mm) to 0.085 inches (2.2 mm) and a nominal weight of 0.43 lb/ft$^2$ (2.1 kg/m$^2$) to 0.55 lb/ft$^2$ (2.7 kg/m$^2$).

Coilable material is particularly suitable because it can be readily shipped from a point of manufacture and cut to form sheets at the point of vehicle manufacture. Use of the coilable material can allow the disclosed material to be prepared on an as-needed basis in a desired size. Such "just in time" manufacturing process can be desirable to reduce costs, as well as facilitating the preparation of highly customized vehicle configurations.

Sheet forms of FRP can also be particularly suitable for use herein are also available from Crane Composites are Noble® Classic and Noble® Select. Sheet form FRP can be difficult to ship without breakage. Accordingly, when backed with lauan, such laminates are usually prepared at the manufacturing location by applying the laminate prior to shipping to the point of vehicle manufacture.

In an exemplary process of the present disclosure, a coiled roll of FRP is provided. The FRP material is uncoiled to and cut to provide a selected sheet size. The cut length of FRP material is fixed in an uncoiled configuration and sprayed on at least one side with a mixture of the aromatic polyester polyether polyol and the diisocyanate components in the appropriate ratios, along with the catalyst. The applied mixture is allowed to cure for a period to achieve green strength so as to allow the coated sheet to be moved. The coated FRP sheet can then be transported to a flat area and allowed to complete the curing such as on a rack arrangement, followed by transportation to the customer, for example, on a flatbed.

The polyurethane reaction product can be incorporated with the FRP to generate a composite laminate material having a variety of thicknesses, to generate an overall composite laminate thickness of from about 1 to about 5 mm, as discussed hereinabove. In some implementations, the thickness of the laminate material can further vary for example, about 1 mm to about 20 mm, or from about 2, 4, 6, 8, 10, 12, 14, 16, 18 or 20 mm, where any value can form an upper or lower endpoint, as appropriate.

Notable benefits are achieved with the composites and methods of the present disclosure when coilable FRP is used as the substrate for coating with the polyurethane composition described herein. In this regard, a long sidewall can be prepared that provides a more attractive presentation with lesser failure potential from seams, etc.

Transportation of the FRP from the source is greatly enhanced to improve the vehicle manufacturing process. Cut sheets of FRP are highly friable, which requires coating to generally take place at the point of FRP manufacture so as to create the strength needed to allow efficient shipping to occur. Use of coilable FRP allows the composite laminate to be generated at or near the point of vehicle manufacture in that the polyurethane layer can be laid down on-site, which enhances the efficiencies at which materials can be provided for assembly of a motor home, recreational vehicle, or trailer. As would be recognized, such increased efficiencies can facilitate just-in-time manufacture. Moreover, the method and composites of the present disclosure can be customized as to size and other features at the point of vehicle manufacture. The lighter weight of the coilable FRP-polyurethanes panels relative to the FRP-lauan sheets that must be shipped pre-made, as opposed to being laminated at or near the manufacturing location for the vehicle as with the disclosed composite laminate, is also a previously unrealized benefit.

A further significant feature of the present disclosure of the coating implementation is the strong adhesion generated between the described polyurethane composition and the FRP material. Such strong adhesion has been surprisingly found by the inventors herein to allow omission of a separate adhesive in preparing the disclosed composite. The omission of a separate adhesive application step provides a number of benefits over conventional laminate composite panels comprising FRP and lauan including, but not limited to, increased manufacturing efficiency, and lower manufacturing cost. Furthermore, supply issues associated with the use of lauan or other substrates are no longer relevant with the disclosed products and methodology, and recycled/sustainable content can be incorporated in the product.

The disclosed laminate composite materials also exhibit improved performance over prior art FRP-lauan composite products. To this end, the FRP-polyurethane laminate composites of the present disclosure are durably moisture resistant, at least because there is a reduced propensity for water to find a point of entry into the composite materials at least because the in situ polymerization generates an adhesion in the form of a substantially continuous layer that is contiguous along the interface. Such adhesion also substantially reduces the possibility that the FRP and polyurethane will delaminate, which is a fairly common occurrence with prior art FRP-lauan products. Cracking and mold/bacterial growth potential are substantially reduced, and even eliminated, with the present disclosure due to the resilience of the polyurethane material in comparison to the more brittle lauan material. The polyurethane material exhibits a high strength to weight ratio that, when formed as a laminate with the FRP material, provides an exceedingly strong composite that is nonetheless very light weight. Moreover, since the laminate materials of the present disclosure do not use adhesive bonding agents, VOCs will be reduced at the point of manufacture, thus reducing environmental hazards generated during the motor home, recreational vehicle, or trailer manufacturing process.

The FRP-polyurethane composite materials of the disclosure can provide additional advantages, particularly over current panel materials used for recreational vehicles, Such improvements include improved resistance to delamination, improved dimensional stability and flexibility, and decreased water absorption and retention. For example, in the area of water absorption and retention, panel materials of the disclosure generally absorb much less water and retain the absorbed moisture for much less time than panel materials containing wood (such as current RV panel materials). Indeed, the disclosed FRP-polyurethane composite materials generally typically absorb less than about 5 wt, % water after immersion in water for 20 hrs. and more particularly less than about 2 wt. % water after immersion in water for 20 hrs. By comparison, wood containing RV panels typically absorb much greater amounts of water (as much as 50-60 wt. % over similar time periods), Water retention time periods for the FRP-polyurethane composite materials herein can be much less than wood containing panel materials (typically less than about an hour compared with about 8 hrs. for wood).

Still further, the ability to create panels that are larger than the standard 4*8 foot sheets possible with lauan can greatly improve the appearance of the vehicle. In this regard, the disclosed composite laminate panels vary in dimensions up to, and including, from 2.4 to 3 meters (8 to 10 feet) wide, and can have a length as great as 15 meters (50 ft) or more. Still further, the disclosed laminate panels can be provided in a size defined by a use case. The larger panel configurations possible with the present disclosure can reduce or even eliminate the need for seaming of separate panels along the sides thereof. Moreover, seaming is a point of structural failure. A reduction in seaming therefore can result in an improvement in the overall strength of the motor home, recreational vehicle, or trailer. Such strength improvements are exhibited in the form of impact strength and otherwise.

Yet further, the polyurethane coating used as a layer in the composites of the present disclosure can exhibit insulative effects. For example, the panel can have an R value of greater than about 1 or about 2 or 3 or up to about 10. As would be appreciated, prior art lauan composite materials exhibit substantially no insulative properties. Such insulative properties can be improved, in various implementations, with use of a blowing agent during fabrication of the composite panels, as would be appreciated. The insulative properties of the disclosed composites herein are an improvement over the prior art panels used for comparable applications. Insulative composite laminate materials will generally be thicker, as would be appreciated.

In an implementation, the FRP-polyurethane composite materials of the disclosure can have a low thermal expansion characteristics (growth). For example, since some RV sidewalls can be very long (30-40 ft.) and subject to extreme temperatures (−40° F. to 180° F.), when used as an RV sidewall or other large body panel, a low thermal growth will help manage thermal expansion of the wall can be provided. In this aspect, the FRP-polyurethane panel exhibits reduced surface deformation versus prior art panels, thereby reducing the potential for delamination and/or fracture and subsequent failure of a body panel material.

FRP-polyurethane composite materials prepared according to the present disclosure can exhibit enhanced thermal expansion characteristics. For example, the coefficient of thermal expansion of the disclosure FRP-polyurethane composite materials can be less than about 20 in./in/° F. in a first and/or second direction (e.g., in either or both the flow and crossflow directions), or less than about 12 in./in/° F., and or less than about 10 in./in/° F. Yet further, the panel and substrate materials may be substantially isotropic or anisotropic in linear expansion characteristics. For example, while not necessarily limited, the coefficients of thermal expansion in first and second directions (e.g., perpendicular directions) may generally differ by less than about 10% or may differ by greater than 10%. In other implementations, the coefficients of thermal expansion in such first and second directions may differ by less than about a factor of two.

The FRP-polyurethane composite materials of the disclosure can be used to form various intermediate and final form articles, including construction articles or articles for use in vehicular applications, including, without limitation, side wall panels such as for vehicles including recreational vehicles (trailers, motor homes, and the like), trucks, and automobiles, as well as rail, marine and air/aerospace vehicles, cargo liners and container panel and substrates, and the like. An example of a configuration of FRP-polyurethane composite materials configured in a recreational vehicle is set out in U.S. Pat. No. 9,409,607, the disclosure of which is incorporated herein in its entirety by this reference. Other such articles will be apparent to the skilled artisan. For certain applications, the panel and substrate materials may also be molded into various articles using methods known in the art, for example, pressure forming, thermal forming, thermal stamping, vacuum forming, compression forming, and autoclaving.

The FRP-polyurethane composite materials herein can be used as a single layer or can be combined with other layers. For example, an outer FRP-polyurethane material and an inner FRP-polyurethane material can be incorporated as outer/interior surfaces with the decorable FRP surfaces faced exterior and interior when assembled into a vehicle or the like, An insulation material can be incorporated between the layers. Example layered arrangements of panels are illustrated in U.S. Pat. No. 8,757,704, the disclosure of which is incorporated herein in its entirety by this reference.

Yet further, the laminate composite panels disclosed herein can be adhered to a second substrate material, such as material that can impart structural support features or other beneficial characteristics. While the composite panels are strong by themselves, in some use cases, such as flooring, it can be beneficial to incorporate further structural support via a second panel material. Still further, insulation and/or sound proofing can be imparted by selection of a suitable second material.

The laminate composite panels can be laminated to the second material via an application of the disclosed polyurethane material. Such adhesive methodologies are disclosed in the '439 Publication, previously incorporated by reference. Yet further, the composite can be adhered to a second panel via a second adhesive material suitable for use therein.

In one or more implementations, the second material to which the laminate composite material is adhered can comprise wood, such as plywood or OSB. The wood structural panel can be coated with the disclosed polyurethane material to reduce or eliminate the incursion of water therein. Still further, the wood structural panel can be sandwiched between two laminate composite panels, that is a first and a second composite panel, with the edges optionally sealed with the polyurethane material or other suitable sealant to substantially prevent water incursion therein. Because the composite material of the present disclosure adds structural support to wood when coated thereon, a thinner wood substrate can be used so as to provide comparable strength at lower overall weight. For example, instead of a typical ⅝ inch plywood flooring material, a ½ inch material can be used with along with the laminate composite herein to provide a lower weight flooring material. Yet further, a benefit of water resistance can be provided over existing flooring materials, which is an improvement for vehicles that are subjected to water, salt, and the like in use.

Still further, the laminate composite material can be incorporated with expanded polystyrene and extruded polystyrene provided in panel form. The polyurethane material herein has been seen to provide excellent adhesion to polystyrene materials. Other adhesive materials can be used, also. The light weight provided by the referenced polystyrene materials when combined with the strength imparted by the composite laminate materials of the present disclosure can provide notable benefits. For example, side panels for use in motor homes, trailers, etc. can incorporate both insulative and structural properties, even while light-weighting vs. prior art panels is provided.

The laminate composite material can further be adhered to a foamed polyurethane material. The foamed polyurethane material can be as set out in the '794 Publication, previously incorporated herein. Still further, other types of foamed polyurethane can be used.

Still further, the laminate composite materials can be adhered to non-woven materials, such as polyester materials that are polyester or polyester-blends. Such non-woven materials can be needle-punched and thermally bonded. Adhesion to the laminate composite material can be via the disclosed polyurethane materials and thermally bonded, as known. To this end, the composite laminate can be used as a substitute for glass reinforced or thermoplastic panels used in vehicles. The incorporation of non-woven materials in such applications can reduce sound transmission into the vehicle and, accordingly, can be useful with the composite laminate materials herein.

FIG. 1 illustrates a FRP-polyurethane composite panel 100 having a FRP layer 105 coated with a polyurethane as disclosed herein 110 adhered to the FRP 105 at an interface 115. Composite panel 100 has substrate outer surface 120 that can be decorated, painted etc. Polyurethane surface 125 can be coated, decorated, etc.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The term "about," as used herein, refers to a range of values that is ±20%, 15%, ±10%, 9%, 8%, 7%, 6%, or ±5% of the specified value, e.g. about 1" refers to the range of 0.8" to 1.2", 0.8" to 1.15", 0.9" to 1.1", 0.91" to 1.09", 0.92" to 1.08", 0.93" to 1.07", 0.94" to 1.06", or 0.95" to 1.05".

Any ratios, concentrations, amounts, and other numerical data can be expressed herein in a range format. Such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'.

The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'x, y, z, or greater' should be interpreted to include the specific ranges of 'about x', 'about y', and 'about z' as well as the ranges of 'greater than x', greater than y', and 'greater than z'. In some aspects, the term "about" can include traditional rounding according to significant figures of the numerical value. In addition, the phrase "about 'x' to 'y'" includes "about 'x' to about 'y'".

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

What is claimed is:

1. A composite laminate comprising:
   a. a first layer comprising a fiber reinforced polyester ("FRP") material having a front-facing side and a back side; and
   b. a second layer comprising a polyurethane reaction product of an aromatic polyester polyether polyol and a diisocyanate, wherein the aromatic polyester polyether polyol has a structure that is either:
      i. based on a glycerol backbone, the structure represented by a formula:

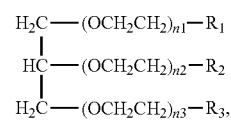

wherein each of $R_1$, $R_2$, and $R_3$ is independently selected from hydroxyl or a structure represented by a formula:

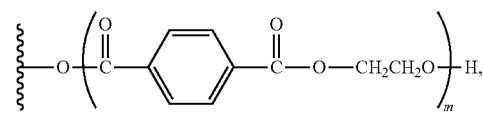

provided that at least one of $R_1$, $R_2$, and $R_3$ is not hydroxyl, wherein m has a value such that the aromatic polyester polyether polyol has a Brookfield Cone and Plate Viscosity of about 5 Poise or less carried out using Spindle #4 at 100 rpm and 60° C., and wherein each of $n_1$, $n_2$, and $n_3$ is an integer independently selected from a group consisting of 0, 1, 2, 3, 4, 5, 6, 7, 8, and 9, provided that a sum of the selected values for $n_1$, $n_2$, and $n_3$ is in a range from 1 to 9;

or ii. based on a trimethylolpropane backbone, the structure represented by a formula:

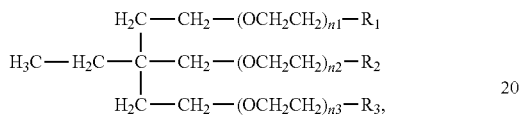

wherein each of $R_1$, $R_2$, and $R_3$ is independently selected from hydroxyl or a structure represented by a formula:

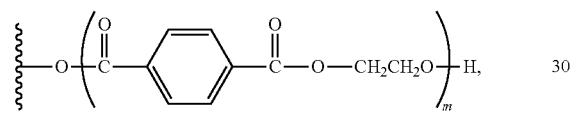

provided that at least one of $R_1$, $R_2$, and $R_3$ is not hydroxyl, wherein each of $n_1$, $n_2$, and $n_3$ is an integer independently selected from a group consisting of 0, 1, 2, 3, 4, 5, 6, 7, 8, and 9, provided that a sum of the selected values for $n_1$, $n_2$, and $n_3$ is in a range from 1 to 9.

2. The composite laminate of claim 1, wherein the aromatic polyester polyether polyol and the diisocyanate are cured-in-place on the back side of the FRP material to form the second layer.

3. The composite laminate of claim 1, wherein the second layer is adhered to the back side of the first layer without application of a separate adhesive layer.

4. The composite laminate of claim 1, wherein the aromatic polyester polyether polyol is derived from a transesterification reaction between polyethylene terephthalate ("PET") and either ethoxylated trimethylol propane or ethoxylated glycerol.

5. The composite laminate of claim 4, wherein the ethoxylated trimethylol propane or ethoxylated glycerol comprise from about 2 to about 9 moles of ethoxylation.

6. The composite laminate of claim 4, wherein at least some of the PET is derived from a recycled source.

7. The composite laminate of claim 2, wherein the composite laminate has a thickness of from about 1 mm to about 5 mm.

8. The composite laminate of claim 2, wherein the second layer is foamed.

9. A composite laminate comprising:
a. a first layer comprising each of:
1. a fiber reinforced polyester ("FRP") material having a front-facing side and a back side; and 2. a polyurethane reaction product of an aromatic polyester polyether polyol and a diisocyanate, wherein the aromatic polyester polyether polyol has a structure that is either:

i. based on a glycerol backbone, the structure represented by a formula:

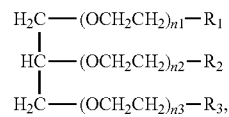

wherein each of $R_1$, $R_2$, and $R_3$ is independently selected from hydroxyl or a structure represented by a formula:

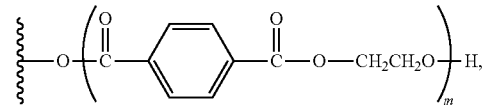

provided that at least one of $R_1$, $R_2$, and $R_3$ is not hydroxyl, wherein m has a value such that the aromatic polyester polyether polyol has a Brookfield Cone and Plate Viscosity of about 5 Poise or less carried out using Spindle #4 at 100 rpm and 60° C.;

and wherein each of $n_1$, $n_2$, and $n_3$ is an integer independently selected from a group consisting of 0, 1, 2, 3, 4, 5, 6, 7, 8, and 9, provided that a sum of the selected values for $n_1$, $n_2$, and $n_3$ is in a range from 1 to 9;

or ii. based on a trimethylolpropane backbone, the structure represented by a formula:

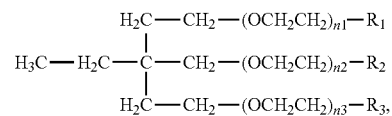

wherein each of $R_1$, $R_2$, and $R_3$ is independently selected from hydroxyl or a structure represented by a formula:

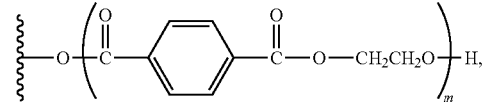

provided that at least one of $R_1$, $R_2$, and $R_3$ is not hydroxyl, wherein each of $n_1$, $n_2$, and $n_3$ is an integer independently selected from a group consisting of 0, 1, 2, 3, 4, 5, 6, 7, 8, and 9, provided that a sum of the selected values for $n_1$, $n_2$, and $n_3$ is in a range from 1 to 9;

wherein the aromatic polyester polyether polyol and the diisocyanate are cured-in-place on the back side of the FRP material to provide a FRP-polyurethane composite laminate as the first layer; and
b. a second layer.

10. The composite laminate of claim 9, wherein the FRP-polyurethane composite laminate is adhered to the second layer via an adhesive.

11. The composite laminate of claim 10, wherein the adhesive comprises a layer of the polyurethane reaction product of the aromatic polyester polyether polyol and a diisocyanate, wherein the aromatic polyester polyether polyol and the diisocyanate are cured-in-place between the first layer and the second layer.

12. The composite laminate of claim 10, wherein the aromatic polyester polyether polyol is derived from a transesterification reaction between polyethylene terephthalate ("PET") and either ethoxylated trimethylol propane or ethoxylated glycerol.

13. The composite laminate of claim 12, wherein the ethoxylated trimethylol propane or ethoxylated glycerol comprise from about 2 to about 9 moles of ethoxylation.

14. The composite laminate of claim 12, wherein at least some of the PET is derived from a recycled source.

15. The composite laminate of claim 10, wherein the second layer comprises wood, non-woven material, expanded polystyrene, extruded polyurethane, or foamed polyurethane.

16. The composite laminate of claim 15, wherein the second layer comprises wood, and the wood comprises plywood or oriented strand board.

17. The composite laminate of claim 15, wherein the second layer comprises foamed polyurethane and the foamed polyurethane is derived from the reaction product of:
a. the aromatic polyester polyether polyol and the diisocyanate, wherein a blowing agent is incorporated therein.

18. The composite laminate of claim 15, wherein the second layer is expanded polystyrene or extruded polyurethane material.

19. The composite laminate of claim 15, wherein the second layer is a non-woven material.

* * * * *